Dec. 13, 1927.  1,652,237
A. H. CANFIELD
TANK BALL
Original Filed Nov. 2, 1922
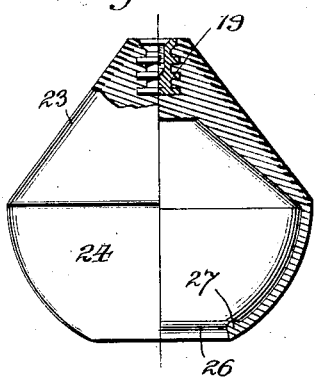
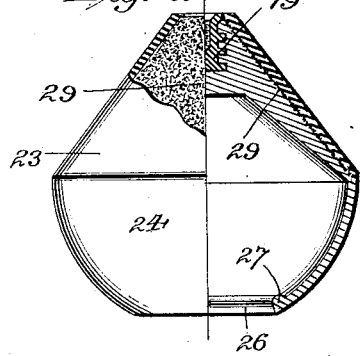
Inventor:
Albert H. Canfield,
by Dodge and Sons
Attorneys.

Patented Dec. 13, 1927.

1,652,237

UNITED STATES PATENT OFFICE.

ALBERT H. CANFIELD, OF BRIDGEPORT, CONNECTICUT.

TANK BALL.

Original application filed November 2, 1922, Serial No. 398,593. Divided and this application filed March 24, 1925. Serial No. 18,013.

This invention pertains to an improved tank ball and has for its main object the production of a superior ball without seams or joints.

The apparatus whereby the method of producing the ball is carried out is set forth in my co-pending application Ser. No. 598,593, filed on or about November 2, 1922, wherein the method is claimed, which application eventuated in Patent Number 1,535,715, dated April 28, 1925. The present application is a division of that application and is presented as such pursuant to the requirements of the Patent Office.

Two forms of the ball falling within the scope of my invention are illustrated in the annexed drawings, wherein,—

Fig. 1 is a sectional elevation of a completed ball; and

Fig. 2 is a similar view showing a slight modification of the structure.

The ball is preferably produced in the manner set forth in the application above referred to, which method may be stated in general terms as follows.

There is placed within a cavity formed in a mold section material sufficient to produce the body of the ball in its entirety, and there is then forced onto said material a second mold section. This section section has a core mounted in a cavity formed therein and in spaced relation to the walls of the cavity, said core likewise having an outwardly extending portion. When the mold sections are brought together, the outwardly extending portion contacts the material and causes a flow thereof throughout the cavities in the mold. The ball thus produced is finally vulcanized.

More specifically stated, the method consists in placing a disk or sheet of hard curing rubber within the cavity formed in the mold, and placing upon such disk a body of soft curing rubber in a quantity sufficient to be co-extensive of the upper and lower portions of the ball. The operations as recited above are carried out to produce the finished product.

There is thus produced a tank ball having a relatively stiff upper portion and a softer seating portion. The body of the ball presents no seams or joints, as where the sections of the ball are pre-formed and joined together by a vulcanizing operation.

In the drawings, and referring first to Fig. 1, the upper portion of the ball presents a frusto-conical section 23 and a lower, substantially hemi-spherical valve-seating contacting section 24 having an opening 26 formed therein, the margin of which opening is defined by an interior rib 27 produced in the act of molding the structure. The rib stiffens the ball against collapse.

The upper outer portion of the ball is formed of hard curing stock which becomes, in a fact, an integral portion of the inner portion of the upper part of the ball which is formed, as above noted, of soft curing stock, which stock continues into the lower valve-seating portion 24 of the ball. The outer, relatively hard portion of the upper part of the ball prevents the ball from collapsing, and together with the thickened inner portion formed of softer material, ensures sufficient rigidity in the structure to enable it to function under all working conditions.

The ball is produced in a single heat and there is no pre-forming or pre-molding of separate sections or halves requiring subsequent joining with a consequent seam. The outer upper end facing formed of the harder material becomes amalgamated with the underlying material. In practice, unless different colored stock is employed, the line of juncture between the two grades of material is imperceptible.

The usual spud 19 is positioned in the upper end of the ball.

In Fig. 2 a slightly modified formation of the tank bulb is illustrated, wherein a layer of fabric, denoted by 29, is shown as lying between and embedded in the adjacent faces or portions of the inner, relatively soft rubber and the harder outer facing body. This may be readily embodied in the structure during the process of manufacturing by imposing a piece of frictioned fabric upon the disk of which the outer hard facing is produced before the body charge of relatively soft curing rubber, of which the body as a whole is produced, is placed in the mold. The presence of this fabric may be found advantageous in tank balls of the larger sizes.

What is claimed is:

1. As a new article of manufacture, a tank ball comprising a body portion formed of relatively soft rubber coextensive of the ball and without seam or joint, the upper portion of the ball having formed therewith an outer layer of relatively hard rubber, said upper portion likewise having a strengthening fabric embodied therein.

2. As a new article of manufacture, a tank ball comprising a body portion formed of relatively soft rubber coextensive of the ball and without seam or joint, the upper portion of the ball having formed therewith a layer of relatively hard rubber, said upper portion likewise having a strengthening fabric embodied therein.

In testimony whereof I have signed my name to this specification.

ALBERT H. CANFIELD.